Patented Jan. 12, 1937

2,067,279

UNITED STATES PATENT OFFICE 2,067,279

EXTRACTION OF VITAMINIFEROUS OILS

Ferdinand W. Nitardy and William S. Jones, Brooklyn, N. Y., assignors to E. R. Squibb & Sons, New York, N. Y., a corporation of New York No Drawing. Application June 30, 1934, Serial No. 733,324

6 Claims. (Cl. 87—6)

This invention relates to, and has for its object the provision of, an efficient method for obtaining the vitaminiferous oil contained in the liver of halibut and kindred fishes, including the salmon, tuna, black cod, ling, and swordfish.

In the practice of this invention, the desired oil is obtained by extracting the liver—the protein of which has been coagulated by processes or agents non-injurious to vitamins A and D, as by cooking or by adding alkali—with a solvent, preferably one selected from the group consisting of ethylene dichloride, trichlorethylene, and dichlorethylether; such extraction being made preferably after adjusting the weight ratio of water to "dry" (which is used herein to mean water-free and oil-free) liver in the extraction mass to between 2 and 4, optimally between 2.8 and 3.2, of the former to 1 of the latter, the adjustment being effected by adding water to the extraction mass, to supply a deficiency, or by evaporating with heat and/or under vacuum, to remove an excess. By maximizing the completeness and speed with which the solvent separates from the liver tissue, this method enables one to obtain quickly substantially all the oil present in the liver.

Examples

The weight ratio of water to "dry" liver in 250 g. of cooked halibut liver is determined by drying, and extracting the fat from, representative samples. In two instances, the ratio being found to be below the desired range, sufficient water is added to bring the ratio to 2.84 and 3.19, respectively; in a third instance, the ratio being found to be 3.14, water is neither added nor removed; in a fourth instance, the ratio being found to be above the desired range, the excess water is expelled by heating in a steam-jacketed vessel until the ratio is reduced to 3.01. Then the mass is extracted successively with one 150-cc. portion and three 125-cc. portions of ethylene dichloride, in each extraction the solvent being added to the mass in a separatory funnel, the mixture being shaken several minutes and allowed to stand for about 45 minutes, and the solvent layer then being drawn off; and the combined extracts are filtered and evaporated under vacuum, yielding the desired oil.

It is to be understood that the foregoing examples are merely illustrative and by no means limitative of the invention, which may be variously otherwise embodied—as with respect to particular fish livers, solvents, water-liver ratios, and procedures—within the scope of the appended claims.

We claim:

1. The method of obtaining the vitaminiferous oil contained in the liver of the halibut and kindred fishes, the protein of which liver has been coagulated, that comprises extracting such liver with a solvent selected from the group consisting of ethylene dichloride, trichlorethylene, and dichlorethylether, after adjusting the weight ratio of water to "dry" liver in the extraction mass to between 2 and 4.

2. The method of obtaining the vitaminiferous oil contained in the liver of the halibut and kindred fishes, the protein of which liver has been coagulated, that comprises extracting such liver with ethylene dichloride, after adjusting the weight ratio of water to "dry" liver in the extraction mass to between 2 and 4.

3. The method of obtaining the vitaminiferous oil contained in the liver of the halibut and kindred fishes, the protein of which liver has been coagulated, that comprises extracting such liver with a solvent selected from the group consisting of ethylene dichloride, trichlorethylene, and dichlorethylether, after adjusting the weight ratio of water to "dry" liver in the extraction mass to between 2.8 and 3.2.

4. The method of obtaining the vitaminiferous oil contained in the liver of the halibut and kindred fishes, the protein of which liver has been coagulated, that comprises extracting such liver with ethylene dichloride, after adjusting the weight ratio of water to "dry" liver in the extraction mass to between 2.8 and 3.2.

5. The method of obtaining the vitaminiferous oil contained in the liver of the halibut and kindred fishes, the protein of which liver has been coagulated, that comprises extracting such liver with a solvent, after adjusting the weight ratio of water to "dry" liver in the extraction mass to between 2 and 4.

6. The method of obtaining the vitaminiferous oil contained in the liver of the halibut and kindred fishes, the protein of which liver has been coagulated, that comprises extracting such liver with a solvent, after adjusting the weight ratio of water to "dry" liver in the extraction mass to between 2.8 and 3.2.

FERDINAND W. NITARDY.
WILLIAM S. JONES.